United States Patent
Guo et al.

(10) Patent No.: US 7,991,843 B2
(45) Date of Patent: Aug. 2, 2011

(54) SYSTEM, METHOD AND COMPUTER PROGRAM PRODUCT FOR MANAGING USER IDENTITIES

(75) Inventors: Yile Guo, Woburn, MA (US); Govind Krishnamurthi, Arlington, MA (US)

(73) Assignee: Nokia Corporation, Espoo (FI)

( * ) Notice: Subject to any disclaimer, the term of this patent is extended or adjusted under 35 U.S.C. 154(b) by 1044 days.

(21) Appl. No.: 10/695,700

(22) Filed: Oct. 29, 2003

(65) Prior Publication Data

US 2005/0108372 A1    May 19, 2005

(51) Int. Cl.
*G06F 15/16* (2006.01)
*G06F 15/173* (2006.01)

(52) U.S. Cl. ........ 709/206; 709/203; 709/219; 709/224; 709/230

(58) Field of Classification Search .................. 709/203, 709/206, 219, 223, 224, 228, 230, 217, 227; 379/210.01; 455/435.1
See application file for complete search history.

(56) References Cited

U.S. PATENT DOCUMENTS

| | | | |
|---|---|---|---|
| 5,872,841 A * | 2/1999 | King et al. | 379/210.01 |
| 5,961,593 A * | 10/1999 | Gabber et al. | 709/219 |
| 6,389,455 B1 * | 5/2002 | Fuisz | 709/206 |
| 6,665,378 B1 * | 12/2003 | Spielman et al. | 709/230 |
| 6,701,154 B2 * | 3/2004 | Ito | 455/456.1 |
| 6,874,023 B1 * | 3/2005 | Pennell et al. | 709/224 |
| 6,901,436 B1 * | 5/2005 | Schneider | 709/219 |
| 7,043,552 B2 * | 5/2006 | Davis | 709/227 |
| 7,054,918 B2 * | 5/2006 | Polcyn | 709/217 |
| 7,065,358 B2 * | 6/2006 | Verma et al. | 455/435.1 |
| 7,085,997 B1 * | 8/2006 | Wu et al. | 709/224 |
| 7,454,206 B1 * | 11/2008 | Phillips et al. | 455/435.1 |
| 2002/0143943 A1 | 10/2002 | Lee et al. | |
| 2002/0173295 A1 | 11/2002 | Nykanen et al. | |
| 2003/0126216 A1 * | 7/2003 | Avila et al. | 709/206 |
| 2003/0135569 A1 * | 7/2003 | Khakoo et al. | 709/206 |
| 2003/0233461 A1 * | 12/2003 | Mariblanca-Nieves et al. | 709/228 |
| 2004/0088349 A1 * | 5/2004 | Beck et al. | 709/203 |
| 2004/0205176 A1 * | 10/2004 | Ting et al. | 709/223 |
| 2004/0225679 A1 * | 11/2004 | Oran | 707/104.1 |

FOREIGN PATENT DOCUMENTS

WO     WO 01/80067 A1     10/2001

* cited by examiner

*Primary Examiner* — Quang N. Nguyen
(74) *Attorney, Agent, or Firm* — Alston & Bird LLP

(57) ABSTRACT

A system for managing a plurality of identities of a user includes a network entity capable of operating a user naming system (UNS). The UNS is capable of receiving, from an application, a request for an identity of a user. The UNS is also capable of automatically selecting a predefined identity based upon the application and at least one user preference independent of user input to the application. The UNS can then provide the selected identity to the application. More particularly, the UNS can receive a request for the identity of a user from a trusted application. Then, the UNS can select an identity further based upon a status of the user. The UNS can alternatively receive a request for the identity of a user from a non-trusted application. Then, the UNS can select or generate a pseudonym, which the UNS can provide to the application.

24 Claims, 5 Drawing Sheets

US 7,991,843 B2

SYSTEM, METHOD AND COMPUTER PROGRAM PRODUCT FOR MANAGING USER IDENTITIES

FIELD OF THE INVENTION

The present invention generally relates to systems and methods for managing user identities and, more particularly, to systems, methods and computer program products for managing user identities for applications requesting an identity of a user.

BACKGROUND OF THE INVENTION

In many communications systems today, including many mobile communications systems, users of such systems typically use a variety of applications operated in conjunction with various service providers, network operators, devices and the like. And as will be appreciated, with the variety of applications, a user can have multiple identities. In this regard, a user can be identified for different applications based upon, for example, an Internet or wide area network (WAN) e-mail address, a corporate or local area network (LAN) e-mail address, a mobile e-mail address, a landline telephone number, a mobile telephone number, and/or one or more pseudonyms or other identifiers.

Typically, a user of communications systems must manually manage and keep track of the user's various identities and with what applications to use each identity. In this regard, a user may use one or more "trusted" applications that are typically configured to use an identity of the user in a manner that maintains the user's privacy. Many trusted applications can require a user to designate a "current preferred identity" for use by the application. For example, an e-mail application may require a user to specify a user identity (e.g., Internet e-mail address, corporate e-mail address, mobile e-mail address, etc.) to use when forwarding e-mail messages. Undesirably, however, conventional applications typically require the user to manually set up, or specify, the preferred identity of the user. Then, each time the user desires for the application to use a different user identity, the user typically must manually change the current preferred identity. To further complicate the user changing the current preferred identity, if multiple applications use the current preferred identity, the user typically must manually change the current preferred identity for each such application.

In addition to one or more trusted applications, a user may use one or more "non-trusted" applications that are not typically configured to maintain the user's privacy. For such non-trusted applications, the user may desire to be identified by one or more different pseudonyms such that the user can otherwise maintain the user's privacy. Conventionally, the user may maintain multiple pseudonyms for different non-trusted applications. However, the user undesirably may be required to manually maintain all of the pseudonyms, and keep track of the non-trusted applications that use respective pseudonyms. And as will be appreciated, such tasks can become quite cumbersome in instances in which the user maintains a large number of pseudonyms for a large number of non-trusted applications.

SUMMARY OF THE INVENTION

In light of the foregoing background, embodiments of the present invention provide a system, method and computer program product for managing user identities. In contrast to conventional techniques for managing a plurality of identities, the system, method and computer program product of embodiments of the present invention are capable of managing the identities of a user without requiring user input to an application requesting one of the identities. More particularly, based upon user preferences (e.g., naming preferences) and an application (e.g., trusted application or non-trusted application) requesting the identity of a user, the system, method and computer program product of embodiments of the present invention are capable of selecting an identity (e.g., mobile e-mail address) of the user, where the selected identity can be provided to the requesting application. Advantageously, embodiments of the present invention are capable of selecting an identity based upon current naming preferences and, for various applications, further based upon a current status of the user.

According to one aspect of the present invention, a system is provided for managing a plurality of identities of a user. The system comprises a network entity capable of operating a user naming system (UNS). The UNS is capable of receiving, from an application, a request for an identity of a user. The UNS is also capable of automatically selecting a predefined identity based upon the application and at least one user preference independent of user input to the application. The UNS can then provide the selected identity to the application. More particularly, the UNS can receive a request for the identity of a user from a trusted application. Then, the UNS can select an identity further based upon a status of the user. The UNS can alternatively receive a request for the identity of a user from a non-trusted application. Then, the UNS can select or generate a pseudonym, which the UNS can provide to the application.

In various instances, the user preference(s) can include at least one naming preference. Then, when a trusted application requests the identity of a user, the UNS can be capable of obtaining a status of the user, and thereafter matching the status of the user with a status of a naming preference that also includes a predefined identity. The UNS can then select the predefined identity of the respective naming preference. More particularly, the UNS can be capable of matching the status of the user with a status of at least one naming preference that further includes at least one application. In such instances, the UNS can be further capable of matching the application requesting the identity with an application of one of the naming preference(s) having a matching status. Then, the UNS can select the predefined identity from the naming preference having a matching status and having a matching application.

In another embodiment, the UNS can also receive a request, select a predefined identity, and provide the selected identity. In this embodiment, the UNS can also identify a current preferred identity based upon at least one user preference and a status of the user. Then, when the UNS receives a request from a trusted application, the UNS can select and provide the current preferred identity. More particularly, when the UNS receives a request from a trusted application, the UNS can obtain a status of the user, and thereafter match the status of the user with a status of a naming preference that also includes a predefined identity. Then, the UNS can identify the predefined identity of the respective naming preference as a current preferred identity.

Further, the UNS can be capable of matching the status of the user with a status of at least one naming preference that further includes at least one application. In such instances, the UNS can be capable of identifying, for each application of each naming preference having a matching status, the predefined identity of the respective naming preference as a current preferred identity of the respective application. Then, when the UNS receives a request from a trusted application, the UNS can select the current preferred identity of an application matching the application requesting the identity.

According to other aspects of the present invention, a method and computer program product are provided for managing a plurality of identities of a user. Therefore, embodiments of the present invention provide a system, method and computer program product for managing a plurality of identities of a user. Advantageously, the system, method and computer program product of embodiments of the present invention are capable of automatically managing the identities of a user without requiring the user to manually configure a preferred identity for each application that requests a user identity. The system, method and computer program product of embodiments of the present invention are further capable of maintaining up-to-date identities based upon user preferences such that, when a user desires to change the preferred identity for one application, the user need not manually change a preferred identity in each application that may request the same identity. Therefore, the system, method and computer program product of embodiments of the present invention solve the problems identified by prior techniques and provide additional advantages.

BRIEF DESCRIPTION OF THE DRAWINGS

Figure 1:
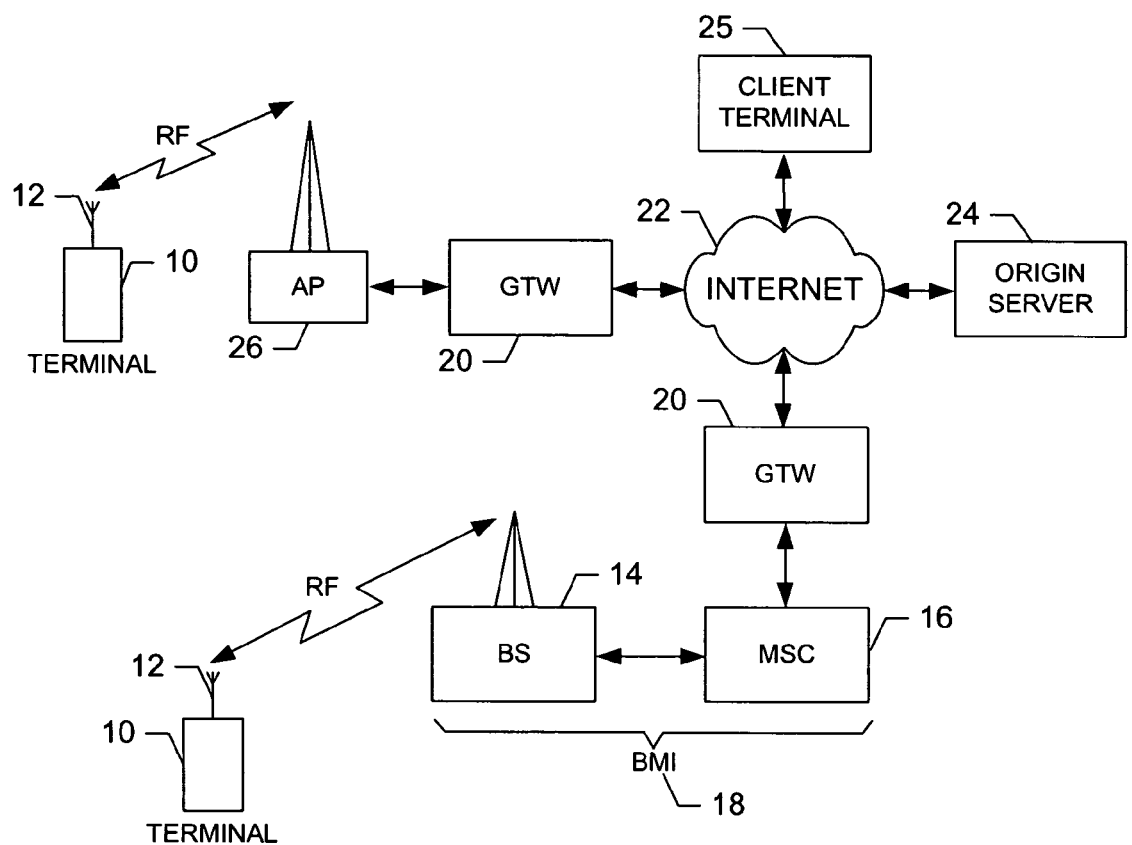
Figure 2:
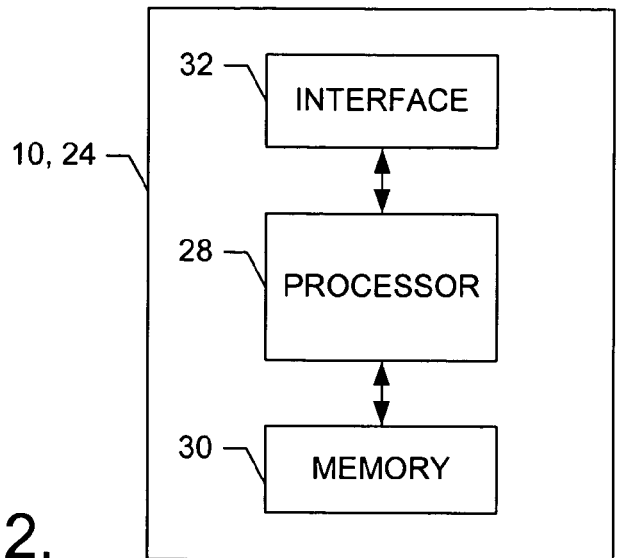
Figure 3:
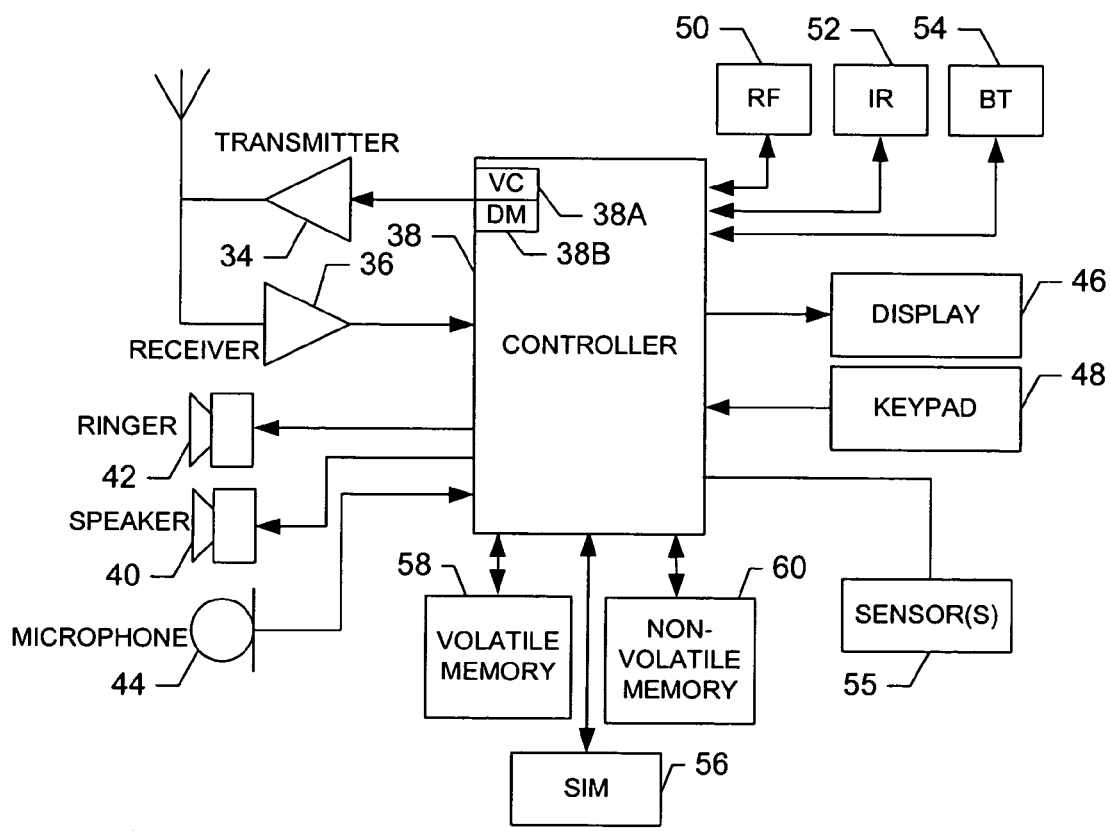
Figure 4:
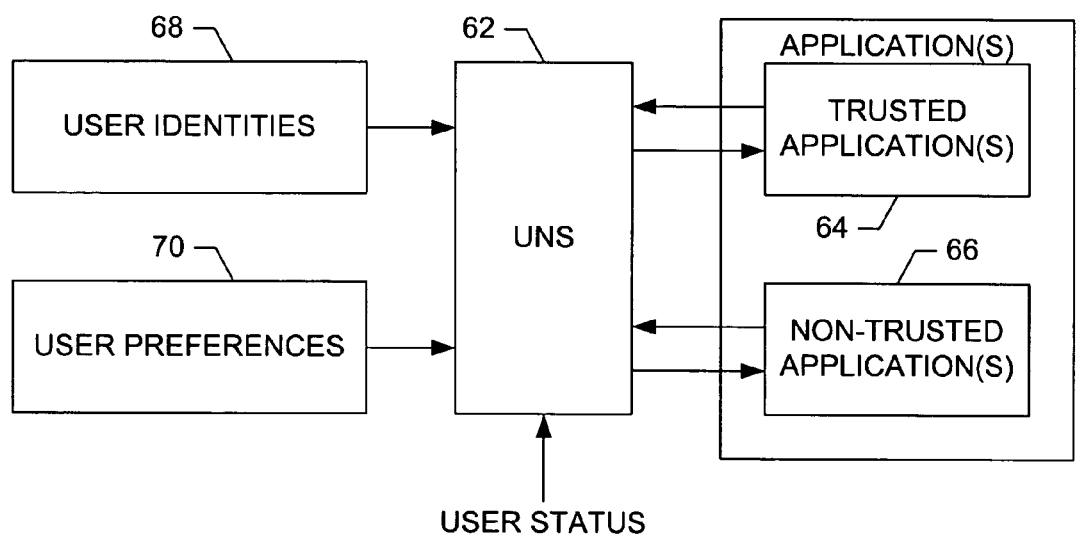
Figure 5:
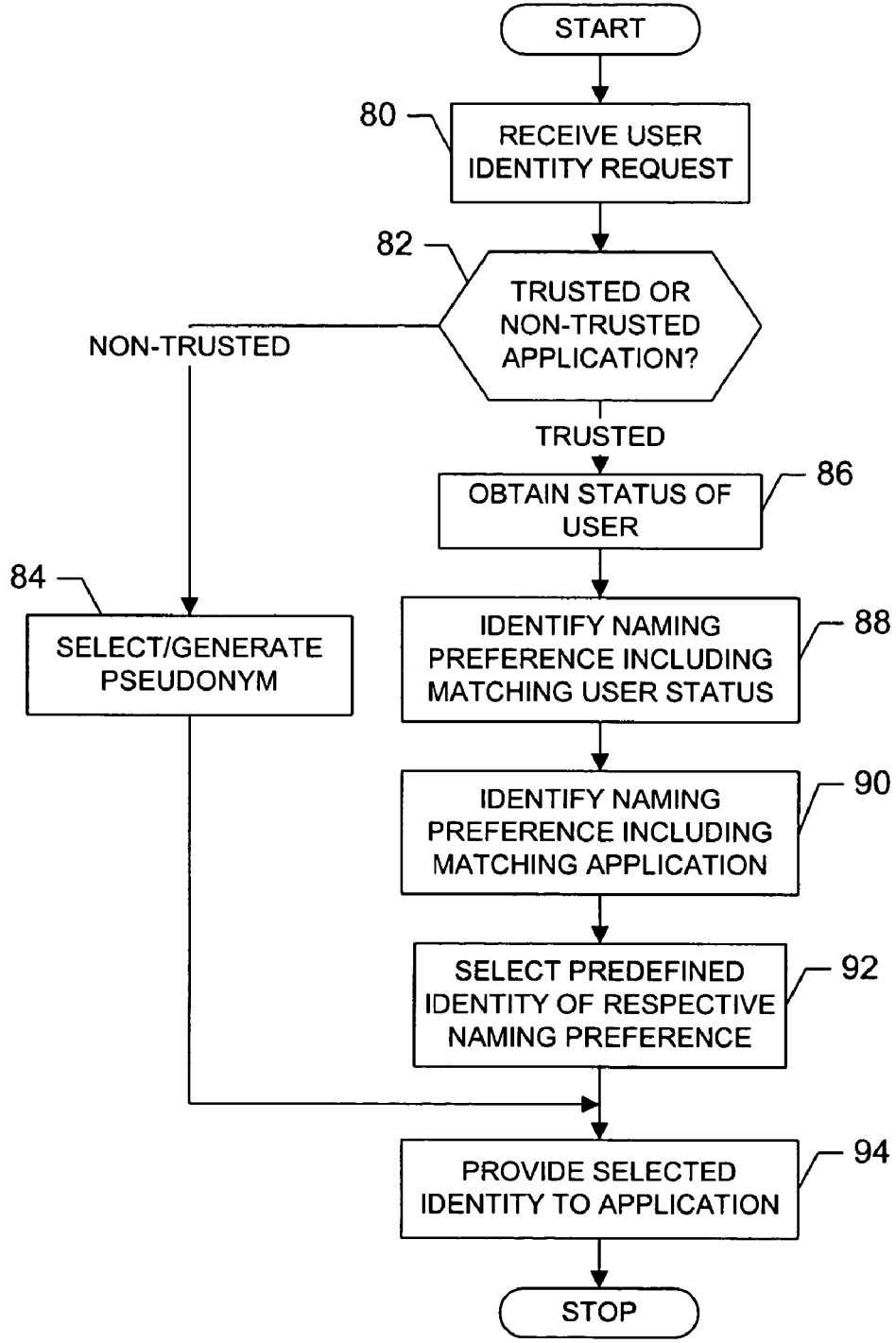
Figure 6:
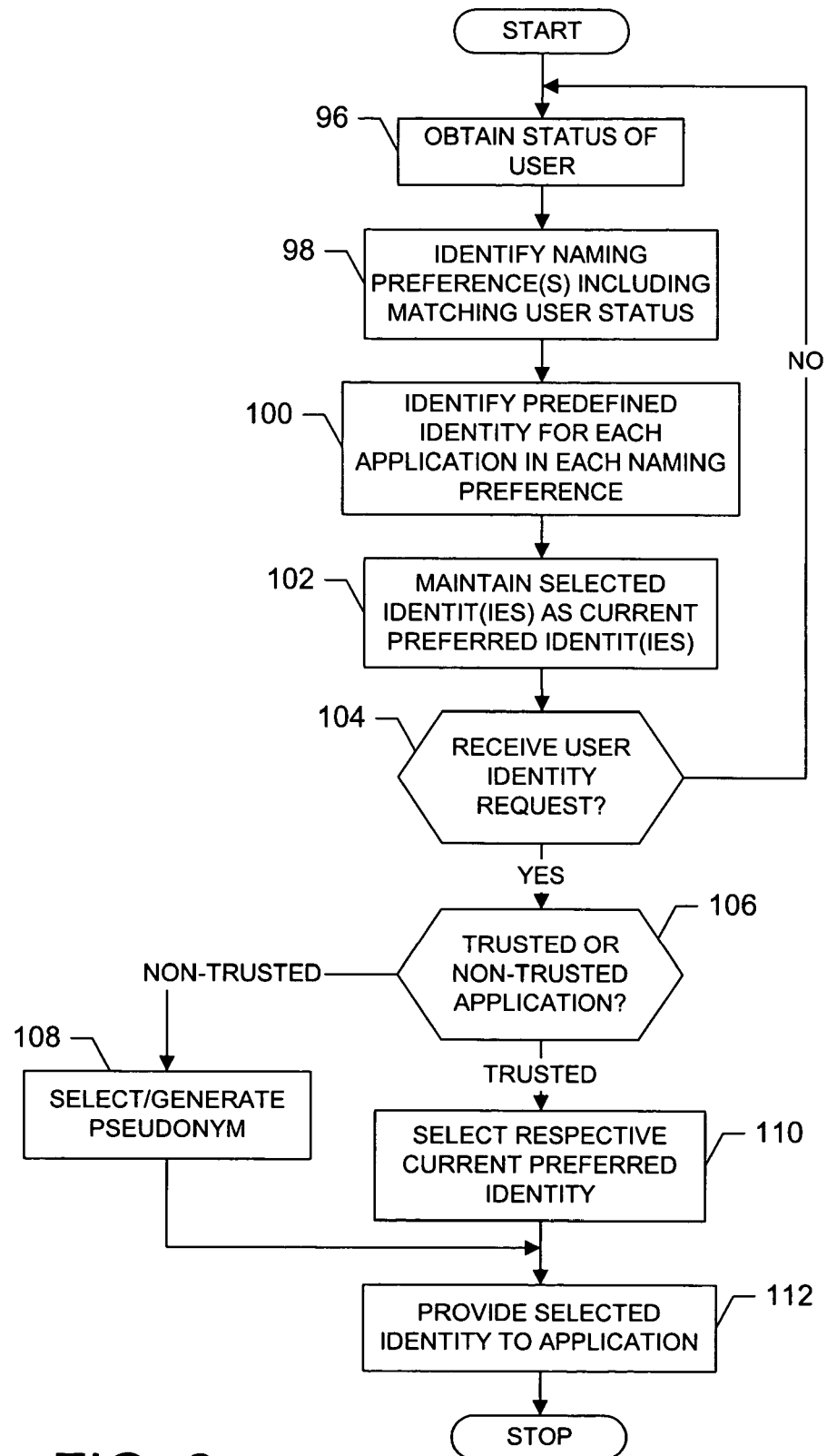

Having thus described the invention in general terms, reference will now be made to the accompanying drawings, which are not necessarily drawn to scale, and wherein:

FIG. 1 is a schematic block diagram of a wireless communications system according to one embodiment of the present invention including a cellular network and a data network to which a terminal is bi-directionally coupled through wireless RF links;

FIG. 2 is a schematic block diagram of an entity capable of operating as a terminal, an origin server and/or a client terminal, in accordance with embodiments of the present invention;

FIG. 3 is a schematic block diagram of a mobile station that may operate as a terminal, according to embodiments of the present invention;

FIG. 4 is a functional block diagram of a user naming system (UNS) operating in accordance with embodiments of the present invention;

FIG. 5 is a flowchart of a method of managing a plurality of identities of a user in accordance with one embodiment of the present invention; and FIG. 6 is a flowchart of a method of managing a plurality of identities of a user in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the terminal, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of a cellular network that includes elements required to operate the network, such as a mobile switching center (MSC) 16. As well known to those skilled in the art, the cellular network may also be referred to as a Base Station/MSC/Interworking function (BMI) 18. In operation, the MSC is capable of routing calls and messages to and from the terminal when the terminal is making and receiving calls. The MSC also provides a connection to landline trunks when the terminal is involved in a call. Further, the MSC can be coupled to a server gateway (GTW) 20.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 20, and the GTW is coupled to a WAN, such as the Internet 22. In turn, devices such as processing elements (e.g., personal computers, server computers or the like) can be coupled to the terminal 10 via the Internet. For example, as explained below, the processing elements can include one or more processing elements associated with origin servers 24, client terminals 25 or the like, one of which being illustrated in FIG. 1.

In addition to, or in lieu of, being coupled to the BS 14, the terminal 10 can be coupled to may be wirelessly coupled to one or more wireless access points (APs) 26. In turn, the APs may be coupled to the Internet 22. Like with the MSC 16, the APs can be directly coupled to the Internet. In one advantageous embodiment, however, the APs are indirectly coupled to the Internet via a GTW 20. As will be appreciated, by directly or indirectly connecting the terminals and the other devices (e.g., the origin server 24) to the Internet, the terminals can communicate with one another and the other devices, such as according to the Hypertext Transfer Protocol (HTTP), to thereby carry out various functions of the terminal.

Referring now to FIG. 2, a block diagram of an entity capable of operating as a terminal 10, an origin server 24 and/or a client terminal 25 is shown in accordance with one embodiment of the present invention. As shown, the entity capable of operating as a terminal, an origin server and/or a client terminal can generally include a processor 28 connected to memory 30. The processor can also be connected to at least one interface 32 or other means for transmitting and/or receiving data, content or the like. The memory can comprise volatile and/or non-volatile memory, and typically stores content, data, instructions or the like. In this regard, the memory can store software applications, instructions or the like for the processor to perform steps associated with operation of the entity in accordance with embodiments of the present invention. For example, the memory of the entity can store a user naming system (UNS) capable of managing at least one identity of a user, such as a user of the respective entity. Also, for example, the memory can store at least one user preference capable of being utilized by the UNS to manage the identit (ies) of the user. Further, as explained below, the memory can store one or more applications, such as an e-mail application, a location-based services application or the like, which are capable of performing one or more functions based upon an identity of the user of the respective terminal.

FIG. 3 illustrates a functional diagram of a mobile station that may operate as a terminal 10, according to embodiments of the invention. It should be understood, that the mobile station illustrated and hereinafter described is merely illustrative of one type of terminal that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, laptop computers and other types of voice and text communications systems, can readily employ the present invention.

The mobile station includes a transmitter 34, a receiver 36, and a controller 38 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first-generation (1G), second-generation (2G), 2.5G and/or third-generation (3G) communication protocols or the like. For example, the mobile station may be capable of operating in accordance with 2G wireless communication protocols IS-136 (TDMA), GSM, and IS-95 (CDMA).

The mobile station can additionally or alternatively be capable of operating in accordance with any of a number of different digital broadcasting techniques, such as the DVB (Digital Video Broadcasting) technique (e.g., DVB-T, ETSI Standard EN 300 744). The mobile station can also be capable of operating in accordance with any of a number of different broadcast and/or multicast techniques, such as the MBMS (Multimedia Broadcast Multicast Service) technique (e.g., 3GPP TS 22.146). Further, the mobile station can be capable of operating in accordance with ISDB-T (Japanese Terrestrial Integrated Service Digital Broadcasting), DAB (Digital Audio Broadcasting), ATSC (Advanced Television Systems Committee) techniques or the like. Some narrow-band AMPS (NAMPS), as well as TACS, mobile stations may also benefit from embodiments of the present invention, as should dual or higher mode mobile stations (e.g., digital/analog or TDMA/CDMA/analog phones).

It is understood that the controller 38 includes the circuitry required for implementing the audio and logic functions of the mobile station. For example, the controller may be comprised of a processor, a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 38A, and may include an internal data modem (DM) 38B. Further, the controller may include the functionally to operate one or more software applications, which may be stored in memory.

The mobile station also comprises a user interface including a conventional earphone or speaker 40, a ringer 42, a microphone 44, a display 46, and a user input interface, all of which are coupled to the controller 38. The user input interface, which allows the mobile station to receive data, can comprise any of a number of devices allowing the mobile station to receive data, such as a keypad 48, a touch display (not shown) or other input device. In embodiments including a keypad, the keypad includes the conventional numeric (0-9) and related keys (#, *), and other keys used for operating the mobile station.

The mobile station can also include one or more means for sharing and/or obtaining data from electronic devices, such as another terminal 10, an origin server 24, an AP 26 or the like, in accordance with any of a number of different wireline and/or wireless techniques. For example, the mobile station can include a radio frequency (RF) transceiver 50 and/or an infrared (IR) transceiver 52 such that the mobile station can share and/or obtain data in accordance with radio frequency and/or infrared techniques. Also, for example, the mobile station can include a Bluetooth (BT) transceiver 54 such that the mobile station can share and/or obtain data in accordance with Bluetooth transfer techniques. Although not shown, the mobile station may additionally or alternatively be capable of transmitting and/or receiving data from electronic devices according to a number of different wireline and/or wireless networking techniques, including LAN and/or WLAN techniques.

The mobile station may also have one or more sensors 55 for sensing the ambient conditions of the mobile user and, more particularly, the mobile station operated by, or otherwise under the control of, the mobile user. In this regard, the mobile station may include sensors such as, for example, a positioning sensor, a touch sensor, an audio sensor, a compass sensor, an ambient light sensor, an ambient temperature sensor and/or a three-axis acceleration sensor. The audio sensor can comprise a microphone as part of the user interface, for example, which can detect speech or environmental sounds. The positioning sensor can comprise, for example, a global positioning system (GPS) sensor. Additionally, or alternatively, the positioning sensor can comprise, for example, a radio beacon triangulation sensor that determines the location of the wireless device by means of a network of radio beacons, base stations, or access points, as is described for example, in Nokia European patent EP 0 767 594 A3, entitled: Mobile Station Positioning System, published on May 12, 1999, the contents of which are hereby incorporated by reference in its entirety.

As will be appreciated, the sensors 55 can also be located in accessory-like mobile station covers and/or in a wireless accessory such as a Bluetooth-enabled device. The sensors may further be located in the environment such as in the user's rooms or vehicles. Also, information capable of being measured by the mobile station, such as the time duration of use of the mobile station, can be received as sensor data by the mobile station. For more information on such sensors, see U.S. patent application Ser. No. 09/854,628, entitled: Context Sensitive Web Services, filed May 15, 2001, which published on Nov. 21, 2002 as U.S. Patent Application Publication No. 2002/0173295, the contents of which is hereby incorporated by reference in its entirety.

The mobile station can further include memory, such as a subscriber identity module (SIM) 56, a removable user identity module (R-UIM) or the like, which typically stores information elements related to a mobile subscriber. In addition to the SIM, the mobile station can include other memory. In this regard, the mobile station can include volatile memory 58. Also, again like the digital broadcast receiving terminal and the digital broadcaster, the mobile station can include other non-volatile memory 60, which can be embedded and/or may be removable. For example, the other non-volatile memory can comprise embedded or removable multimedia memory cards (MMC's), Memory Sticks manufactured by Sony Corporation, EEPROM, flash memory or the like.

The memories 56, 58, 60 can store any of a number of pieces of information and data used by the mobile station to implement the functions of the mobile station. For example, the memories can store an identifier, such as an international mobile equipment identification (IMEI) code, capable of uniquely identifying the mobile station, such as to the MSC 16. Also, as explained in more detail below, the memories can store the UNS, as well as a plurality of user identities and user preferences for managing the user identities. In addition, as also explained below, the memories can store one or more applications, such as an e-mail application, a location-based services application or the like, which can perform one or more functions based upon an identity of the user of the respective terminal.

As indicated in the background section, when operating a "trusted" application that uses an identity of a user, the user must typically manually set a "current preferred identity" of the user, where the current preferred identity typically comprises a true identity of the user. For example, the current preferred identity can comprise a preferred Internet e-mail address, corporate e-mail address, mobile e-mail address, landline telephone number or mobile telephone number, for use of the application. Then, each time the user desires to designate a different current preferred identity, the user typically must manually change the current preferred identity in each application that uses the current preferred identity. As also explained in the background section, when operating a "non-trusted" application, the user may desire to be identified by one or more different pseudonyms, such as "guest," so that the user can otherwise maintain the user's privacy. Conventionally, however, the user undesirably may be required to manually maintain all of the pseudonyms, and keep track of the non-trusted applications that use respective pseudonyms.

Embodiments of the present invention therefore provide a user naming system (UNS) capable of managing a plurality of identities of a user for one or more applications capable of performing at least one function based upon an identity of the user. As explained above, the identities can comprise any of a number of different identifiers capable of identifying a user of a network entity. For example, the identities can include true identities such as an Internet or wide area network (WAN) e-mail address, a corporate or local area network (LAN) e-mail address, a mobile e-mail address, a landline telephone number, a mobile telephone number. Additionally, or alternatively, the identities can include one or more pseudonyms or other identifiers.

As described herein, the UNS typically comprises software capable of being stored within memory and operated by a processor of a network entity. For example, the UNS can comprise software capable of being stored within memory (e.g., non-volatile memory 60) and operated by a processor (e.g., the controller 38) of a terminal 10. It should be understood, however, that the UNS can alternatively comprise firmware or hardware, without departing from the spirit and scope of the present invention. As also described herein, the UNS manages the identities of a user of a terminal, although it should be understood that the UNS can manage the identities of a user of another network entity, such as an origin server 24 or a client terminal 25.

It should also be understood that the UNS can be stored within memory and operated by a processor of a network entity other than a terminal 10 without departing from the spirit and scope of the present invention. For example, the UNS can be stored and operated by an origin server 24, client terminal 25 or the like. In addition, it should be understood that the UNS need not be stored or operated by the same network entity operated by a user whose identities are being managed by the UNS. For example, the UNS can be stored and operated by an origin server to manage the identities of a user of a terminal 10 or a client terminal 25. Further, it should be understood that an application requesting a user identity and the UNS can be operated by the same network entity or a different network entity. For example, the application requesting a user identity and the UNS can both be operated by a terminal or a client terminal. Alternatively, for example, the application requesting a user identity can be operated by an origin server, while the UNS can be operated by a terminal or a client terminal.

To facilitate managing the identities of a user for one or more applications capable of performing at least one function based upon an identity of the user, each application can be designated as a "trusted" application or a "non-trusted" application. Reference is now made to FIG. 4, which illustrates a functional block diagram of the UNS 62 operating with one or more trusted applications 64 and/or one or more non-trusted applications 66, in accordance with embodiments of the present invention. Generally, the trusted application(s) include those applications configured to use an identity of the user in a manner that maintains the user's privacy. In contrast, the non-trusted application(s) generally include those applications that are not typically configured to maintain the user's privacy.

Each application can be designated as a trusted application 64 or a non-trusted application 66 in any of a number of different manners. For example, the UNS can designate each of one or more applications as a trusted application or a non-trusted application based upon user input. Additionally or alternatively, for example, each of one or more applications can be designated as a trusted application or a non-trusted application based upon the location of the respective application with respect to the terminal 10 operated by the user whose identity is requested. For example, one or more applications operated from the terminal can be designated as trusted applications, with applications operated from another network entity (e.g., origin server 24) designated as non-trusted applications. As will be appreciated, as each application is typically designated as trusted or non-trusted 64, 66, either the trusted or non-trusted applications can be specifically designated with the remaining applications indirectly designated as the other type of application. For example, all of the trusted applications can be specifically designated, with all other applications indirectly designated as non-trusted applications. Alternatively, although less typically, all of the non-trusted applications can be specifically designated, with all other applications indirectly designated as trusted applications.

As also shown in FIG. 4, the UNS 62 can manage a plurality of user identities 68 of a user of a terminal 10, where the user identities can be stored in memory (e.g., non-volatile memory 60) of the terminal. More particularly, the UNS can manage the plurality of user identities based upon one or more user preferences 70, which are also capable of being stored in memory of the terminal. The user preferences can include any of a number of preferences capable of being used by the UNS to manage the user identities with respect to the trusted applications 64 and non-trusted applications 66. In this regard, the user preferences can comprise rules by which the UNS determines a response to a request from an application for a user identity. More particularly, the user preferences can include a number of naming preferences. Each naming preference can include a predefined identity of the user. Also, each naming preference can include a status of the user of the terminal or the terminal itself. Further, each naming preference can include one or more applications capable of receiving the respective predefined identity in response to a request for an identity of the user. For example, a naming preference can specify a predefined identity as comprising a mobile e-mail address for an e-mail application when the user has a status comprising "out of the office."

In addition to naming preferences, the user preferences 70 can also include any one or more of a number of different additional or alternative preferences, rules or the like. In this regard, the user preferences can include, for example, one or more privacy preferences. The privacy preferences can comprise any of a number of different preferences, rules or the like specifying how and/or when a predefined identity can be provided to an application. More particularly, one or more privacy preferences can specify that trusted applications are capable of receiving a true identity of the user (e.g., Internet e-mail address, corporate e-mail address, mobile e-mail address, landline telephone number, mobile telephone number, etc.), while non-trusted applications are only capable of receiving a pseudonym of the user. In this regard, the privacy preferences can specify one or more trusted applications and/or one or more non-trusted applications.

Reference is now made to FIG. 5, which illustrates various steps in managing a plurality of identities of a user. As shown, the method can include the UNS 62 receiving a request from an application (e.g., trusted application 64 or non-trusted application 66) for a user identity, as shown in block 80. As will be appreciated, the request can include any of a number of different pieces of information. For example, the request can identify the application requesting the identity of the user. As an example, consider a trusted e-mail application configured to forward e-mail messages to the user having a selectable identity (e.g., Internet e-mail address, mobile e-mail address, etc.). In such an instance, upon receipt of an e-mail message, the e-mail application can request an identity of the user to determine where to forward the received e-mail message. As another example, consider the same e-mail application configured such that, when sending e-mail messages to one or more recipients, the e-mail application designates a selectable identity of the user as the sending party. In such an instance, the e-mail application can request an identity of the user to determine which identity to designate as the sending party of an e-mail message to one or more specified recipients. As yet another example, consider an origin server 24 capable of operating a non-trusted location-based service application, such as a location-based weather application. In this instance, the weather application can request an identity (e.g., mobile e-mail address) of the user of the terminal such that the weather application can provide, in addition to location-based weather information, advertisements to the identified user, such as advertisements based upon the location of the terminal 10.

Irrespective of the request for the user identity from the application, after receiving the request, the UNS 62 can determine, from the privacy preferences, whether the application is a trusted application 64 or a non-trusted application 66, as shown in block 82. Generally, then, the UNS can select a user identity from the plurality of user identities 68 based upon the requesting application (i.e., trusted application or a non-trusted application) and one or more user preferences 70. Thus, as shown in block 84, if the application is a non-trusted application, the UNS can select a predefined identity based upon a privacy preference specifying that non-trusted applications are only capable of receiving a pseudonym of the user. The UNS can, if so desired, select the predefined identity further based upon a naming preference specifying a pseudonym for non-trusted applications, or for the requesting non-trusted application. For example, the UNS can select the user identity further based upon a naming preference specifying the pseudonym "guest" for non-trusted applications. In various instances, however, the user preferences need not include a naming preference specifying such a pseudonym. In such instances, the UNS can select a default pseudonym from the user identities. Alternatively, the UNS can generate a pseudonym, which can thereafter be stored and maintained with the user identities.

If the application is a trusted application, the UNS 62 can select a predefined identity from the plurality of user identities 68 based upon one or more user preferences, and further based upon a status of the user. As shown in block 86, the UNS can continuously obtain a status of the user, where the status comprises any of a number of different statuses capable of being communicated to the UNS. For example, the status can comprise a location and/or context of the user whose identity is requested, or more particularly the location and/or context of the terminal 10 operated by the user, where the location and/or context can be obtained and provided to the UNS in any of a number of different known manners. As described herein, the status, including location and/or context, will be described in terms of the user. It should be understood, however, that the status of the user can, in various instances, more particularly comprise the status of the terminal operated by the user.

The location of the user of the terminal 10 can be obtained in any of a number of different manners, such as by determining the location of the terminal. In this regard, the terminal can be responsible for determining its current location. In such instances, the terminal can determine its current location in any of a number of different manners. For example, the terminal can be capable of determining its current location based upon information obtained by the access technology of the terminal, such as the current cell ID. Additionally, or alternatively, the terminal can determine its current location from sources local to, or distributed from, the terminal. For example, the terminal can determine its current location from a GPS sensor. In addition to or in lieu of the terminal determining its current location, a location provider (not shown) can be responsible for determining the current location. In this regard, the location provider can determine the location of the terminal, such as in accordance with any of a number of known techniques. For more information on one type of location provider, often referred to as a location server, see European telecommunications Standards Institute (ETSI) technical specification entitled: *Location Services* (3GPP TS23.171 and GSM 03.71), the contents of which are hereby incorporated by reference in its entirety.

Like the location of the user of the terminal 10, the context of the user of the terminal can be obtained in any of a number of different manners. In this regard, the context can be obtained based upon user input to the terminal. For example, a context such as the user being "out of the office" can be obtained from a user input to the terminal specifying the context. Additionally, or alternatively, the context can be obtained from information that may be determined and/or received by the terminal, such as from any one or more sensors (e.g., sensors 55) or the like. For example, consider defining a context of a user of the terminal as being "out of the office" when the user is located within a vehicle. In such an instance, the context of the terminal or user with respect to the vehicle can be based upon information capable of identifying the terminal or user as being located inside the vehicle.

The information indicative of the context can comprise any one or more of a number of different pieces of information. For example, the information can comprise an identifier (e.g., RFID) of a vehicle, where the identifier is capable of being continuously received by the terminal 10 (e.g., via radio frequency transceiver 50) while the terminal is inside the vehicle. Alternatively, for example, a three-axis acceleration sensor can measure movement of the terminal. Thereafter, the movement can be processed into information that may include the current absolute value of acceleration, the value integrated over several seconds, and/or a rough estimate whether the terminal or user of the terminal is sitting in the vehicle. As will be appreciated, the information indicative of the context can comprise one or more pieces of information fused or aggregated from several sources.

Irrespective of how the status (e.g., location, context, etc.) of the user of the terminal 10 is obtained, the UNS 62 can receive the status of the user, and identify one or more naming preferences including a status matching the status of the user obtained by the UNS, as shown in block 88. For example, presume that the UNS receives a status of the user indicating that the user is "out of the office." In such an instance, continuing the example above, the UNS can identify that a naming preference specifying the status "out of the office." As indicated above, each naming preference can also include one or more applications capable of receiving the respective predefined identity. Thus, in various instances, the UNS can further determine, from the naming preferences including a matching status, a naming preference including an application matching the requesting application, as shown in block 90. Thus, for example, for an e-mail application requesting a user identity, the UNS can identify the naming preference specifying the e-mail application in addition to the status "out of the office."

After determining the naming preference including a matching status and application, the UNS 62 can select the predefined identity from the respective naming preference, as shown in block 92. For example, for an email application requesting a user identity, the UNS can select the mobile e-mail address as the predefined identity, where the respective naming preference also specifies the e-mail application and the status "out of the office."

As will be appreciated, in various instances, the user preferences 70 may not include a naming preference having a matching status, or may not include a naming preference having a matching status and application (if specified in the naming preference(s) with a matching status). In such instances, the UNS 62 can select a predefined identity in any of a number of different manners. For example, the UNS can select a default predefined identity, such as an identity that most readily identifies the user (e.g., Internet e-mail address). Alternatively, for example, the UNS can store, along with each of the user identities 68, one or more attributes associated with each user identity. The attributes can include, for example, one or more applications that typically use a respective user identity, one or more network entities typically operating the application, one or more service providers capable of providing access service to the application(s), one or more access networks typically provided by the service provider (s), one or more user privacy preferences, and/or a naming system typically specifying a format of the respective user identity.

For example, a predefined identity comprising an Internet e-mail address can be associated with attributes including a private e-mail application; a network entity comprising a personal computer/laptop computer; an Internet Service Provider (ISP)/portal; an Internet access network; a privacy preference specifying that the Internet e-mail address only be shared with a list of one or more trusted parties; and a naming system specifying the Domain Name System (DNS). Also, for example, a predefined identity comprising a corporate e-mail address can be associated with attributes including a corporate or business e-mail application; a network entity comprising a corporate computer/laptop computer; a service provider comprising an employer; an access network comprising a corporate local area network (LAN), remote access and a virtual private network (VPN); privacy preferences specifying that the corporate e-mail address only be shared with a list of one or more co-workers, business partners or the like; and a naming system specifying DNS and a corporate directory server.

As another example, a predefined identity comprising an mobile telephone number can be associated with attributes including a mobile voice/data application; a network entity comprising a mobile station; a service provider comprising a mobile operator; an access network comprising a mobile network; a privacy preference specifying that the mobile telephone number only be shared with a list of one or more correspondents; and a naming system specifying the International Public Telecommunication Numbering Plan (E.164). As yet another example, a predefined identity comprising a pseudonym can be associated with attributes including non-trusted applications; a service provider comprising an ISP/portal; an Internet access network; a privacy preference specifying that the pseudonym be shared with non-trusted parties; and a naming system specifying DNS.

Irrespective of the attributes associated with each of the user identities 68, in instances in which the user preferences 70 do not include a naming preference having a matching status, or do not include a naming preference having a matching status and application, the UNS 62 can select a predefined identity based upon the attributes associated with the respective identities. For example, the UNS can select a predefined identity having attributes specifying an application matching the application requesting the identity of the user. Alternatively, and particularly in instances in which more than one user identity has attributes that specify a matching application, the UNS can select a predefined identity associated with a greater number of attributes in line with the application requesting the user identity (e.g., network entity operating the requesting application, service provider providing access service to the requesting application, access network provided by the service provider, etc.).

After selecting a predefined identity of the user, the UNS 62 can provide the selected identity, whether a pseudonym (for non-trusted applications 66) or true identity (for trusted applications 64), to the requesting application, as shown in block 94. Thereafter, the requesting application can utilize the selected identity to perform one or more functions. For example, when the application comprises an e-mail application, the e-mail application can use the selected identity to forward received e-mail messages. Also, for example, an e-mail application can use the selected identity to designate the sending party of e-mail messages to one or more specified recipients. Further, for example, a location-based services application can use the selected identity to provide a location-based service (e.g., location-based weather) to the terminal 10, without advertisements that could otherwise be provided if the application received a true identity of the user.

As will be appreciated, in various instances, the UNS 62 can be capable of selecting one or more predefined identities independent of a request for a user identity from an application. In this regard, reference is now made to FIG. 6, which illustrates various steps of a method of managing a plurality of identities of a user in accordance with another embodiment of the present invention. As shown, the UNS can be capable of continuously obtaining a status of the user such as in a manner described above, as shown in block 96. Then, as shown in block 98, the UNS can be capable of identifying one or more naming preferences including a matching status, such as in the same manner described above. For each such naming preference, then, the UNS can identify and maintain, such as in memory one or more "current preferred identities," as shown in blocks 100 and 102.

More particularly, the UNS 62 can maintain a current preferred identity for each application specified in each naming preference that also includes a matching status. In this regard, if only one naming preference includes a matching status, and the respective naming preference does not specify an application, the UNS can maintain a single current preferred identity. But when one or more naming preferences include a matching status and also specify one or more applications, the UNS can maintain a current preferred identity for each naming preference and application combination. And presuming that more than one naming preference typically does not include the same status and application, the UNS can maintain a current preferred identity for each status and application combination from the naming preference(s) including a matching status.

The UNS 62 can continuously maintain the current preferred identit(ies) by continuously receiving the status of the user such that if the status changes, the UNS can change the current preferred identit(ies). As the UNS maintains the current preferred identit(ies), the UNS can receive a user identity request from an application, such as in the same manner described above, as shown in block 104. Also in the same manner described above, the UNS can determine if the requesting application is a trusted application 64 or non-trusted application 66, as shown in block 106. If the requesting application is a non-trusted application, the UNS can select/generate a pseudonym, typically in the same manner described above with respect to FIG. 5, as shown in block 108. As illustrated in block 110, however, if the requesting application is a trusted application, the UNS can select the current preferred identity for the respective application. Thereafter, as before, the UNS can provide the selected identity, whether a pseudonym or true identity (for trusted applications), to the requesting application, as shown in block 112.

According to one aspect of the present invention, all or a portion of the system of the present invention, such all or portions of the terminal 10, origin server 24, and/or client terminal 25, generally operates under control of a computer program product (e.g., UNS 62). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 5 and 6 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus, the apparatus comprising:
a processor on a wireless terminal; and
a memory including computer program code,
the memory and the computer program code configured to, with the processor, cause the apparatus to at least:
receive, from an application on the wireless terminal, a request for an identity of a user;
automatically select one of a plurality of identities selectable for use by the respective application, the respective identity being selected based upon the application and at least one user preference, and independent of user input to the application; and
cause the selected identity to be provided to the application,
wherein being configured to cause the apparatus to automatically select one of a plurality of identities based upon the application includes being configured to cause the apparatus to determine whether the application is a trusted application or a non-trusted application, and select one of a plurality of identities based on the determination.

2. The apparatus of claim 1, wherein being configured to cause the apparatus to receive a request includes being configured to cause the apparatus to receive, from a trusted application, a request for an identity of a user, and
wherein being configured to cause the apparatus to automatically select one of a plurality of identities includes being configured to cause the apparatus to automatically select an identity further based upon a status of the user.

3. The apparatus of claim 2, wherein the at least one user preference comprises at least one naming preference, and wherein being configured to cause the apparatus to automatically select one of a plurality of identities includes being configured to cause the apparatus to:
  obtain a status of the user;
  match the status of the user with a status of a naming preference that also includes a predefined identity; and
  select the predefined identity of the respective naming preference.

4. The apparatus of claim 3, wherein being configured to cause the apparatus to match the status includes being configured to cause the apparatus to match the status of the user with a status of at least one naming preference that further includes at least one application, wherein the memory and the computer program code are further configured to, with the processor, cause the apparatus to further:
  match the application requesting the identity with an application of one of the at least one naming preference having a matching status, and
  wherein being configured to cause the apparatus to select the predefined identity includes being configured to cause the apparatus to select the predefined identity from the naming preference having a matching status and having a matching application.

5. The apparatus of claim 1, wherein being configured to cause the apparatus to receive a request includes being configured to cause the apparatus to receive, from a non-trusted application, a request for an identity of a user,
  wherein being configured to cause the apparatus to automatically select one of a plurality of identities includes being configured to cause the apparatus to automatically select or generate a pseudonym, and
  wherein being configured to cause the apparatus to cause the selected identity to be provided includes being configured to cause the apparatus to cause the pseudonym to be provided.

6. The apparatus of claim 1, wherein the memory and the computer program code are further configured to, with the processor, cause the apparatus to further:
  identify a current preferred identity based upon at least one user preference and a status of the user,
  wherein being configured to cause the apparatus to receive a request includes being configured to cause the apparatus to receive, from a trusted application, a request for an identity of a user and select the current preferred identity.

7. The apparatus of claim 6, wherein the at least one user preference comprises at least one naming preference, and wherein being configured to cause the apparatus to identify a current preferred identity includes being configured to cause the apparatus to:
  obtain a status of the user;
  match the status of the user with a status of a naming preference that also includes a predefined identity; and
  identify the predefined identity of the respective naming preference as a current preferred identity.

8. The apparatus of claim 7, wherein being configured to cause the apparatus to match the status includes being configured to cause the apparatus to match the status of the user with a status of at least one naming preference that further includes at least one application,
  wherein being configured to cause the apparatus to identify the predefined identity includes being configured to cause the apparatus to identify, for each application of each naming preference having a matching status, the predefined identity of the respective naming preference as a current preferred identity of the respective application, and
  wherein being configured to cause the apparatus to select the current preferred identity includes being configured to cause the apparatus to select the current preferred identity of an application matching the application requesting the identity.

9. A method of managing a plurality of identities of a user, the method comprising:
  receiving, from an application on a wireless terminal, a request for an identity of a user;
  on the wireless terminal, automatically selecting one of a plurality of identities selectable for use by the respective application, the respective identity being selected based upon the application and at least one user preference, and independent of user input to the application; and
  causing the selected identity to be provided to the application,
  automatically selecting one of a plurality of identities based upon the application includes determining whether the application is a trusted application or a non-trusted application, and selecting one of a plurality of identities based on the determination.

10. The method of claim 9, wherein receiving a request comprises receiving, from a trusted application, a request for an identity of a user, and wherein selecting an identity comprises selecting an identity further based upon a status of the user.

11. The method of claim 10, wherein the at least one user preference comprises at least one naming preference, and wherein selecting a predefined identity comprises:
  obtaining a status of the user;
  matching the status of the user with a status of a naming preference that also includes a predefined identity; and
  selecting the predefined identity of the respective naming preference.

12. The method of claim 11, wherein matching the status of the user comprises matching the status of the user with a status of at least one naming preference that further includes at least one application, and wherein the method further comprises:
  matching the application requesting the identity with an application of one of the at least one naming preference having a matching status,
  wherein selecting the predefined identity comprises selecting the predefined identity from the naming preference having a matching status and having a matching application.

13. The method of claim 9, wherein receiving a request comprises receiving, from a non-trusted application, a request for an identity of a user, wherein selecting an identity comprises one of selecting or generating a pseudonym, and wherein causing the selected identity to be provided comprises causing the pseudonym to be provided to the application.

14. The method of claim 9 further comprising:
  identifying a current preferred identity based upon at least one user preference and a status of the user,
  wherein receiving a request comprises receiving, from a trusted application, a request for an identity of a user, and wherein selecting a predefined identity comprises selecting the current preferred identity.

15. The method of claim 14, wherein the at least one user preference comprises at least one naming preference, and wherein identifying a current preferred identity comprises:
  obtaining a status of the user;
  matching the status of the user with a status of a naming preference that also includes a predefined identity; and identifying the predefined identity of the respective naming preference as a current preferred identity.

16. The method of claim 15, wherein matching the status of the user comprises matching the status of the user with a status of at least one naming preference that further includes at least one application, wherein identifying the predefined identity comprises identifying, for each application of each naming preference having a matching status, the predefined identity of the respective naming preference as a current preferred identity of the respective application, and wherein selecting the current preferred identity comprises selecting the current preferred identity of an application matching the application requesting the identity.

17. A computer-readable storage medium on a wireless terminal and having computer-readable program code portions stored therein, the computer-readable storage medium and having computer-readable program code portions being configured to, with a processor, cause an apparatus to at least:
   receive, from an application on the wireless terminal, a request for an identity of a user;
   select one of a plurality of identities selectable for use by the respective application the respective identity being selected based upon the application and at least one user preference, and independent of user input to the application; and
   cause the selected identity to be provided to the application,
   wherein being configured to cause the apparatus to automatically select one of a plurality of identities based upon the application includes being configured to cause the apparatus to determine whether the application is a trusted application or a non-trusted application, and select one of a plurality of identities based on the determination.

18. The computer-readable storage medium of claim 17, wherein being configured to cause the apparatus to receive a request includes being configured to cause the apparatus to receive, from a trusted application, a request for an identity of a user, and
   wherein being configured to cause the apparatus to automatically select one of a plurality of identities includes being configured to cause the apparatus to automatically select an identity further based upon a status of the user.

19. The computer-readable storage medium of claim 18, wherein the at least one user preference comprises at least one naming preference, and wherein being configured to cause the apparatus to automatically select one of a plurality of identities includes being configured to cause the apparatus to:
   obtain a status of the user;
   match the status of the user with a status of a naming preference that also includes a predefined identity; and
   select the predefined identity of the respective naming preference.

20. The computer-readable storage medium of claim 19, wherein being configured to cause the apparatus to match the status includes being configured to cause the apparatus to match the status of the user with a status of at least one naming preference that further includes at least one application, wherein the computer-readable storage medium and computer-readable program code portions are further configured to, with the processor, cause the apparatus to further:
   match the application requesting the identity with an application of one of the at least one naming preference having a matching status, and
   wherein being configured to cause the apparatus to select the predefined identity includes being configured to cause the apparatus to select the predefined identity from the naming preference having a matching status and having a matching application.

21. The computer-readable storage medium of claim 17, wherein being configured to cause the apparatus to receive a request includes being configured to cause the apparatus to receive, from a non-trusted application, a request for an identity of a user,
   wherein being configured to cause the apparatus to select an identity includes being configured to cause the apparatus to one of select or generate a pseudonym, and
   wherein being configured to cause the apparatus to cause the selected identity to be provided includes being configured to cause the apparatus to cause the pseudonym to be provided to the application.

22. The computer-readable storage medium of claim 17, wherein the computer-readable storage medium and computer-readable program code portions are further configured to, with the processor, cause the apparatus to further:
   identify a current preferred identity based upon at least one user preference and a status of the user,
   wherein being configured to cause the apparatus to receive a request includes being configured to cause the apparatus to receive, from a trusted application, a request for an identity of a user and select the current preferred identity.

23. The computer-readable storage medium of claim 22, wherein the at least one user preference comprises at least one naming preference, and wherein the being configured to cause the apparatus to identify a current preferred identity includes being configured to cause the apparatus to:
   obtain a status of the user;
   match the status of the user with a status of a naming preference that also includes a predefined identity; and
   identify the predefined identity of the respective naming preference as a current preferred identity.

24. The computer-readable storage medium of claim 23, wherein being configured to cause the apparatus to match the status includes being configured to cause the apparatus to match the status of the user with a status of at least one naming preference that further includes at least one application,
   wherein being configured to cause the apparatus to identify the predefined identity includes being configured to cause the apparatus to identify, for each application of each naming preference having a matching status, the predefined identity of the respective naming preference as a current preferred identity of the respective application, and
   wherein being configured to cause the apparatus to select the current preferred identity includes being configured to cause the apparatus to select the current preferred identity of an application matching the application requesting the identity.

* * * * *